United States Patent [19]

Schulte et al.

[11] Patent Number: 5,019,324
[45] Date of Patent: May 28, 1991

[54] CENTERING ARRANGEMENT FOR ALIGNING THE MUTUALLY ADJACENT OPENINGS OF A LOCK AND A CONTAINER FOR HOLDING RADIOACTIVE MATERIALS

[75] Inventors: Burkart Schulte, Minden; Norbert Hardt, Hanover; Rainer Köhne, Zell/Main, all of Fed. Rep. of Germany

[73] Assignee: Deutsche Gesellschaft für Wiederaufarbeitung von Kernbrennstoffen mbH, Hanover, Fed. Rep. of Germany

[21] Appl. No.: 408,266

[22] Filed: Sep. 18, 1989

[30] Foreign Application Priority Data

Sep. 19, 1988 [DE] Fed. Rep. of Germany ....... 3831774

[51] Int. Cl.⁵ .................... G21F 7/00; G21C 19/32
[52] U.S. Cl. .................... 376/260; 414/146; 414/401
[58] Field of Search ............... 376/260, 261, 272, 258, 376/203; 414/146, 401

[56] References Cited

U.S. PATENT DOCUMENTS 4,636,351 1/1987 Rohr .................................. 376/272
4,704,539 11/1987 Dequesnes et al. ................ 376/272
4,975,240 12/1990 Lahr et al. ........................... 376/272

*Primary Examiner*—Daniel D. Wasil
*Attorney, Agent, or Firm*—Walter Ottesen

[57] ABSTRACT

The invention is directed to a centering arrangement for aligning two mutually adjacent openings of a lock and a container for receiving radioactive waste which is passed into the container through the lock. The container is provided with additional openings having a cross-sectional center point which is displaced from the cross-sectional point of the container per se. The centering arrangement includes a carrier which is pivotally journalled on a vehicle so as to be movable from a vertical plane into a horizontal plane and the vehicle is movable along rails in a horizontal direction. The longitudinal axis of the container is in a position aligned to a fixed point of the lock. The carrier includes a first container guide including an annular member having an inner conical surface and a second conical guide for positioning the container openings with respect to the rotational position of the container. The base of the carrier and the base of the container conjointly define an interface at which centering pins and corresponding counter openings are provided. The carrier is equipped with holders for holding the container in its centered end position.

8 Claims, 1 Drawing Sheet

CENTERING ARRANGEMENT FOR ALIGNING THE MUTUALLY ADJACENT OPENINGS OF A LOCK AND A CONTAINER FOR HOLDING RADIOACTIVE MATERIALS

FIELD OF THE INVENTION

The invention relates to a centering arrangement for aligning the mutually adjacent openings of a lock of a nuclear facility and a container for holding radioactive waste. The container has at least one opening having a cross-sectional center point which is displaced with respect to the cross-sectional center point of the container per se.

SUMMARY OF THE INVENTION

It is an object of the invention to provide a centering arrangement which eliminates centering operations at the lock of a nuclear facility.

The centering arrangement of the invention is for aligning a lock opening in a lock of a nuclear facility with a loading opening in the base wall of a container for holding radioactive materials passed through the two openings when the container is docked at the lock. The centering arrangement includes: a guided vehicle movable in a horizontal direction; a carrier pivotally mounted on the vehicle for pivotal movement between a vertical position and a horizontal position; the lock having a fixed point thereon; the carrier having a carrier longitudinal axis and disposed on the vehicle so as to cause the axis to be in alignment with the fixed point when the carrier is in the horizontal position; the carrier having an upper region defining an opening through which the container is lowered when loaded into the carrier while the carrier is in the vertical position; the carrier and the container conjointly defining first, second and third contact engaging interfaces as the container is lowered into the carrier; first centering means at the first interface for adjusting the rotational position of the container about the longitudinal axis thereof to precenter the loading opening with respect to the lock opening; second centering means at the second interface for positioning the container so as to cause the longitudinal axis thereof to be centered on the carrier longitudinal axis with a first degree of accuracy; third centering means at the third interface for further positioning the container so as to cause the longitudinal axis thereof to be centered to the carrier longitudinal axis with a second degree of accuracy greater than the first degree of accuracy thereby providing a precise alignment of the loading opening with the lock opening when the container is docked at the lock; and, holding means for securing the container in the carrier after the container is completely lowered and centered in the carrier.

With the arrangement according to the invention, centering takes place exclusively at the container and at a location remote from the lock. This reduces the danger of damage to the lock when docking the container at the lock. In addition, the arrangement according to the invention carries out the above object with simple mechanical means which function without difficulty. Electronic components are not required which would otherwise be subjected to a high failure rate and have a short service life in a nuclear environment.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
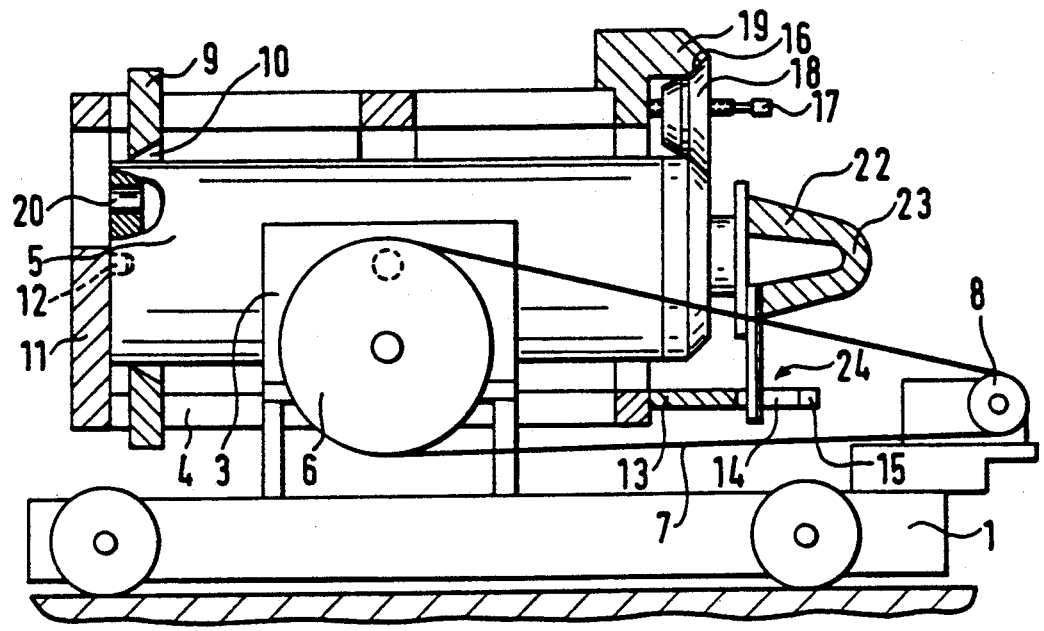
FIG. 1 is a side elevation view, partially in section, of a centering arrangement according to the invention with the container positioned in its centered end position in a carrier mounted on a guided vehicle.
Figure 2:
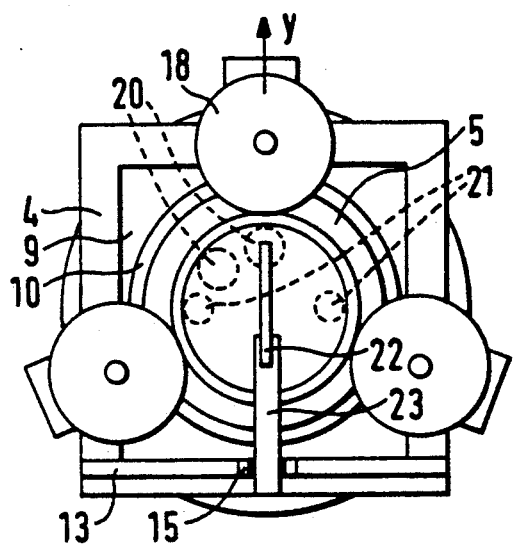
FIG. 2 is a front elevation view of the container carrier with the container mounted therein as shown in FIG. 1 but without the vehicle; and, FIG. 3 is a front elevation plan view of a portion of a lock of a nuclear facility showing openings for communicating with corresponding openings in the base of the container when the latter is docked at the lock.
Figure 3:
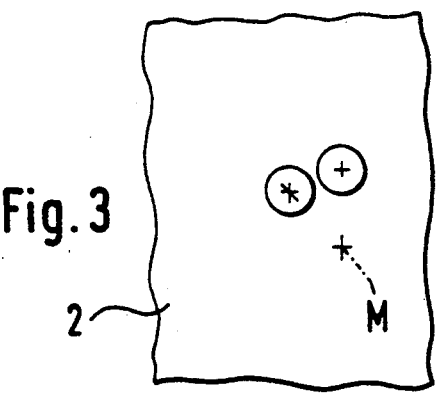

Referring to FIG. 1, reference numeral 1 indicates a laterally guided vehicle for operating on rails and which is remotely controlled so as to be movable in the direction of a lock 2. The vehicle 1 has two side holders 3 for accommodating a Maltese-cross transmission (not shown) for pivotally journalling the carrier 4. The carrier 4 comprises a frame and accommodates a container 5 therein. The Maltese-cross transmission for pivoting the carrier 4 is actuated via a toothed disk 6, a toothed belt 7 and a toothed disk 8 via a drive (not shown).

The container carrier 4 is equipped with an annular part 9 having an inner conical surface 10. Two pins 12 are provided in the base 11 of the container carrier 4 and each of these pins has a conical end portion.

A part 13 is attached to the carrier 4 at the head region thereof and has a slot-like opening 14 which expands outwardly so that the opening 14 terminates in a V-cut 15. Three holders 16 are likewise provided at the head region of the container carrier 4 and are uniformly distributed about the periphery of the carrier. The holders 16 each include a clamping piece 18 and a counter clamp 19 pivotally mounted on the frame of the carrier 4 and a remotely-manipulated spindle 17 for tightening clamping piece 18 to hold the container 5 in place.

The container 5 has two through openings 20 and two blind openings 21 all arranged at the lower end thereof. The container 5 is equipped with a holding loop 22 on its upper end so as to permit transport of the container via an overhead crane. The holding loop 22 is releasably attached to the container and in a position which cannot be mistaken. The holding loop 22 is provided with a part 23 configured as a rod having a circular cross section. The parts 23 and 13 are guide parts which conjointly define a container guide 24.

The operation of the centering arrangement of the invention is described below.

The container 5 is a terminal storage container for cut irradiated fuel rods and is positioned with a remotely-controlled crane into the carrier 4 with the latter in the vertical position. For centering, the container 5 first reaches the opening 14 of guide part 13 with its guide part 23 whereby a precentering of the container 5 occurs. This centering is in a very specific angular position with respect to the longitudinal axis of the container and is predetermined by the position of the lock openings.

The container 5 then passes through the annular part 9 which centers the container 5 with its longitudinal axis to the longitudinal axis of the carrier 4. The longitudinal axis of the carrier is calibrated to the point M of the lock 2. Just before the container 5 meets up with the base 11, the two pins 12 on the carrier 4 engage corresponding ones of the blind openings 21 in the base of the container 5 which effects a fine centering. Then, when the container 5 comes into contact engagement with the base 11, an even finer centering is obtained which brings the container 5 into precisely a position which assures an accurate alignment of the container openings 20 with corresponding ones of the openings in the lock when the container 5 is later docked at the lock 2.

The container 5 is held in this position to prevent a change in position by means of the holders 16 which are pivoted into place and tightened.

The carrier 4 together with the container 5 is then pivoted out of the vertical position into a precise horizontal position by means of the Maltese-cross transmission. The container is then transported to the lock 2 so as to be docked thereat.

One of the two container openings 20 is provided for filling the container with fuel rods which have been just previously cut to a length corresponding to the inner length of the container. The other container opening 20 is provided for a conduit which is connected to a vacuum device for drawing away the dust in the container 5 which was produced by cutting the fuel rods.

It is understood that the foregoing description is that of the preferred embodiments of the invention and that various changes and modifications may be made thereto without departing from the spirit and scope of the invention as defined in the appended claims.

What is claimed is:

1. In a nuclear facility having a lock, a container, and a centering arrangement for aligning a lock opening in the lock with a loading opening in the base wall of the container for holding radioactive materials passed through the two openings when the container is docked at the lock, the centering arrangement comprising:

a guided vehicle movable in a horizontal direction;

a carrier pivotally mounted on said vehicle for pivotal movement between a vertical position and a horizontal position;

said lock having a fixed point thereon;

said carrier having a carrier longitudinal axis and disposed on said vehicle so as to cause said axis to be in alignment with said fixed point when said carrier is in said horizontal position;

said carrier having an upper region defining an opening through which the container is lowered when loaded into said carrier while said carrier is in said vertical position;

said carrier and said container conjointly defining first, second and third contact engaging interfaces as said container is lowered into said carrier;

first centering means at said first interface for adjusting the rotational position of the container about the longitudinal axis thereof to precenter the loading opening with respect to the lock opening;

second centering means at said second interface for positioning the container so as to cause the longitudinal axis thereof to be centered on said carrier longitudinal axis with a first degree of accuracy;

third centering means at said third interface for further positioning the container so as to cause the longitudinal axis thereof to be centered on said carrier longitudinal axis with a second degree of accuracy greater than said first degree of accuracy thereby providing a precise alignment of said loading opening with said lock opening when the container is docked at said lock; and, holding means for securing said container in said carrier after the container is completely lowered and centered in said carrier.

2. The centering arrangement of claim 1, the container having an upper end opposite said base wall thereof; said carrier having a bottom opposite said upper region thereof and a lower region next to said bottom; said first interface being at said upper region of said carrier and said upper end of said container; and, said second interface being disposed at the lower region of said carrier.

3. The centering arrangement of claim 2, said second centering means comprising an annular member mounted in said carrier at said lower region of said carrier and having an annular conical surface for contact engaging the outer surface of the container as it is lowered into the carrier thereby centering said longitudinal axes with respect to each other to said first degree of accuracy.

4. The centering arrangement of claim 3, said loading opening and said container having respective cross sections defining respective center points; said first centering means comprising a first guide part disposed on said upper end of said container and a second guide part formed on said carrier at said upper region thereof for engaging said first guide part to define said first interface as said container is lowered into said carrier for adjusting the rotational position of the container about the longitudinal axis thereof; and, said guide parts being positioned on said container and said carrier, respectively, so as to intersect a line (y) passing through said center points at said first interface.

5. The centering arrangement of claim 4, said line (y) being a vertical line after the container is completely centered and at rest in said carrier.

6. The centering arrangement of claim 4, said second guide part being a plate defining a slot having a V-shaped opening at its outer end for guiding said first guide part as the container is lowered into the carrier.

7. The centering arrangement of claim 4, said container having holding means detachably mounted on said upper end of the container; and, said first guide part being mounted on said holding means.

8. The centering arrangement of claim 4, said third centering means comprising two center pins mounted on said bottom of said carrier and two centering holes formed in said base wall of the container for receiving respective ones of said centering pins therein.

* * * * *